United States Patent [19]
Kronogård

[11] 3,958,655
[45] May 25, 1976

[54] GAS TURBINE ENGINE FOR VEHICLE PROPULSION

[75] Inventor: Sven-Olof Kronogård, Lomma, Sweden

[73] Assignee: United Turbine AB & Co., Kommanditbolag, Malmo, Sweden

[22] Filed: Apr. 1, 1975

[21] Appl. No.: 564,048

Related U.S. Application Data

[63] Continuation-in-part of Ser. No. 466,502, May 2, 1974, Pat. No. 3,889,771.

[30] Foreign Application Priority Data
May 22, 1973 Sweden .............................. 7307155

[52] U.S. Cl. ................................ 180/66 A; 74/687; 74/DIG. 5; 180/53 R; 180/54 F
[51] Int. Cl.² ............................................ B60K 3/04
[58] Field of Search ............... 180/66 A, 64 R, 54 F, 180/56, 55, 62, 42, 53 R, 53 D; 74/687, 688, 682, 792, DIG. 5

[56] References Cited
UNITED STATES PATENTS

| | | |
|---|---|---|
| 2,090,123 | 8/1937 | Hoffman .......................... 180/54 F |
| 3,093,010 | 6/1963 | Spreitzer et al .................. 180/66 A |
| 3,367,106 | 2/1968 | Robinson ......................... 74/DIG. 5 |
| 3,478,622 | 11/1969 | Reid .................................... 74/792 |
| 3,488,947 | 1/1970 | Miller et al. .................... 180/66 A |
| 3,497,024 | 2/1970 | De Lavenne .................... 180/54 F |
| 3,498,057 | 3/1970 | Kronogard et al. ............. 180/66 A |
| 3,626,692 | 12/1971 | Kumm ............................... 74/687 |

*Primary Examiner*—M. H. Wood, Jr.
*Assistant Examiner*—David M. Mitchell
*Attorney, Agent, or Firm*—Holman & Stern

[57] ABSTRACT

In order to provide adequate space for bumpers and auxiliaries, the propulsion engine of a vehicle is arranged transversely with respect to the longitudinal axis of the vehicle. The engine is a gas turbine unit having its power take-off shaft parallel to its rotor axis. The power transmission to the wheels of the vehicle includes a differential located outside the engine and below the same, being connected to the power take-off shaft by a transmission including a reversing step.

3 Claims, 2 Drawing Figures

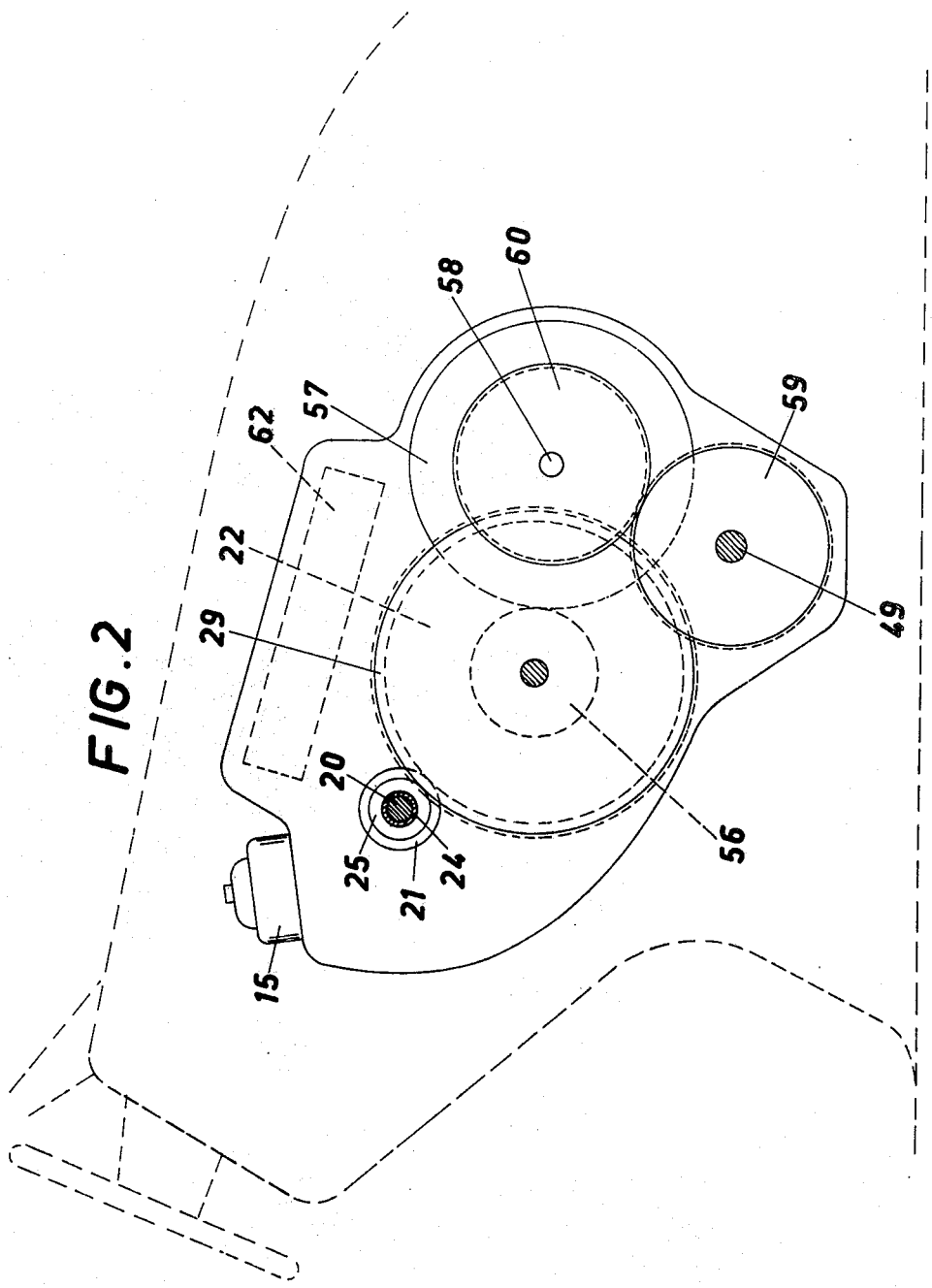

3,958,655

GAS TURBINE ENGINE FOR VEHICLE PROPULSION

RELATED APPLICATION

This is a continuation-in-part of my application 466,502, filed May 2, 1974 now U.S. Pat. No. 3,889,771 issued June 17, 1975.

BACKGROUND OF THE INVENTION

The demands upon an automotive vehicle concerning the emissions in the exhaust gases are very rigid, and may be expected to be still further increased. A further demand, which also will be raised, concerns curves, increased safety with respect to maneuverability, capacity for taking curvs, acceleration and retardation on slippery roads, as well as with respect to injuries to passengers and damages to material caused by collisions. The latter consideration will necessitate more efficient bumpers, requiring increased length and cost of he car, or a reduction of the space available for passengers and luggage. Neither is acceptable to any larger extent.

SUMMARY OF THE INVENTION

One object of the present invention is to provide an automotive engine having a low emission content, and which furthermore, together with the necessary reversing gear, will obtain a very compact structure, so collision bumpers may be fitted to the car without noticeably increasing the length thereof, and which also is adapted to permit mounting in cars of different types and sizes.

A further object of the invention is to arrange the power transmission from the engine to the driven vehicle wheels in such a manner that pendulum shafts connecting a differential with the wheels will obtain sufficient length.

The engine is a gas turbine, which inherently has low emission contents, and in order to attain the desired compact structure, it includes a rotor unit comprising a compressor and a turbine rotor driving the same, as well as first and second power turbine rotors mounted upon concentric shafts being aligned with the axis of the compressor/turbine rotor unit, and further including a transmission comprising a further shaft geared to the turbine rotor shafts within a common housing and adapted to transfer power between the power turbine rotors and the compressor/turbine rotor system.

When an engine of this type is arranged with its axes transversely with respect to the longitudinal axis of the vehicle, considerable difficulties will be encountered in providing pendulum shafts of sufficient length between the power take-off and the driven wheels, so satisfactory movements of the wheels due to the action of the springs is ensured. According to the present invention, the power take-off from the power turbine rotors is aligned with the transmission shaft and a first planetary gearing, enclosed in a housing and including a sun wheel, a planetary wheel carrier and an enclosing ring wheel, is mounted upon the power take-off. The sun wheel is carried by the power take-off, upon which the planetary wheel carrier is rotatably mounted and the ring wheel is geared to a pinion, means being provided at the power take-off and at the housing for locking, at will, the planetary wheel carrier to either of the power take-off or the housing. A differential is located about midway between the pair of wheels and two pendulum shafts are provided to connect the differential with the vehicle wheels, an external gear wheel being provided for driving the differential, and an external transmission shaft, having a gear wheel at each end for cooperation with the ring wheel pinion and the differential external gear wheel, respectively, connects the first planetary gearing with the differentail.

BRIEF DESCRIPTION OF THE DRAWINGS

FIG. 2 shows schematically an end view of the various components of the power transmission.

DESCRIPTION OF THE PREFERRED EMBODIMENT

Figure 1:
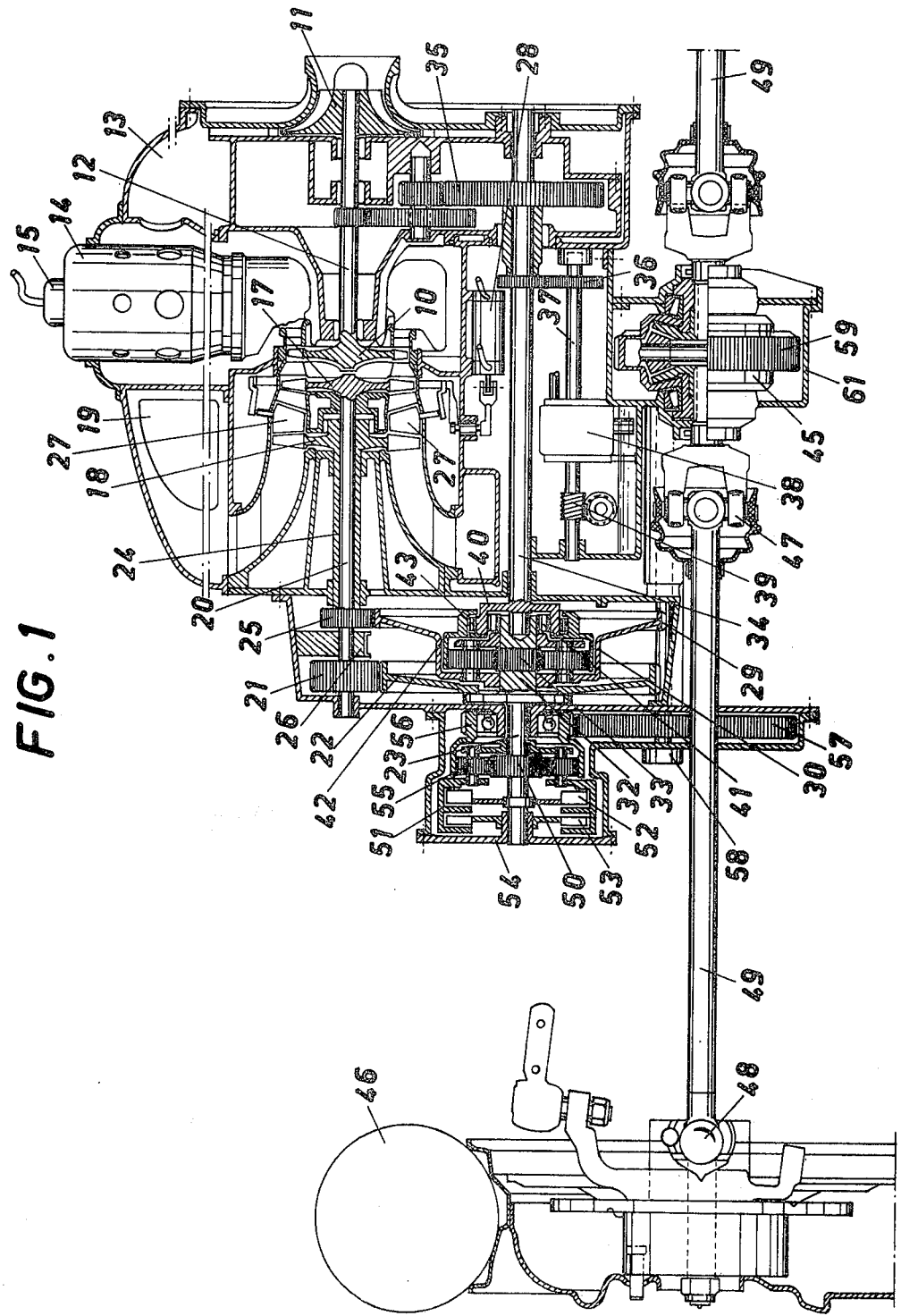
FIG. 1 shows a longitudinal section through the gas turbine propulsion engine of a vehicle and parts of the power transmission to the vehicle wheels.

The gas turbine engine shwon in the drawings includes a first turbine rotor 10 driving a compressor 11, and mounted upon the same shaft 12 as the latter. The air delivered by the compressor is collected in a chamber 13, and is then conveyed to a combustion apparatus 14, provided with means 15 for injecting fuel.

The hot gases generated by the combustion apparatus is, by way of a distributor chamber 16, first brought to pass the compressor turbine rotor 10, and thereafter through two power turbine rotors, 17 and 18, respectively, arranged axially downstream of the compressor turbine rotor 10. From the downstream power turbine rotor, the exhaust gases are conveyed to a collecting chamber 19, and then to an outlet, possibly passing through a heat exchanger (indicated at 62 in FIG. 2) for transferring residual heat to the air passing from chamber 13 to the combustion apparatus 14.

The turbine rotor 17 is the primary power turbine, with a pinion 21 being mounted upon its shaft 20. This pinion cooperates with a large diameter gear wheel 22, which is fixedly connected to a power take-off 23.

The second turbine rotor 18 is mounted upon a hollow shaft 24, which concentrically encloses the shaft 20, and upon which a second pinion 25 is mounted. The shaft 20 freely passes through the second pinion 25, and a hollow shaft 24 is carried in a bearing 26 located between the two pinions 25 and 21, respectively.

Adjustable guide vanes 27 are provided between the turbine rotors 17 and 18 to make possible a distribution of the energy of the gases between the two rotors, as called for by the occasional load upon the plant. The adjustment of these guide vanes is brought about by means of a pressure fluid operated motor 28. Guide vanes my be fitted upstream of the first power turbine rotor, to act in cooperation with, or instead of the guide vanes 27.

The pinion 25 cooperates with a large diameter gear wheel 29, having a bowl shaped hub 30. This is not permanently connected to any shaft, but is formed as a carrier for satellite gear wheels 31 in a first planetary gearing.

The large diameter gear wheel 22 is provided with a trunnion 32 extending away from, but being unitary with the power take-off shaft 23, and carrying a sun wheel of the first planetary gearing. One end of a transmission shaft 34 is journalled in the trunnion 32. The transmission shaft 34 extends towards the compressor end of the plant, and cooperates with the compressor shaft 12 by way of a stepped gear 35.

A further gear 36 cooperating with the transmission shaft 34 drives an auxiliary shaft 37, upon which a subricating oil pump 38 and a worm gear 39 for driving an electric generator and/or other auxiliaries are mounted.

The end of the transmission shaft 34 turned towards the planetary gearing is formed as a collar 40, which, with a clearance, encloses the free end of the tunnion 32. Between the latter and collar 40 a first freewheel 41 is fitted. A ring wheel 42 of the planetary gearing is carried by the collar 40 and forms, together with the latter, a second freewheel 43.

Depending upon the occasional load upon the plant, the amount of fuel supplied and the position of the guide vanes 27, the turbine rotor 18, by way of either or both free wheels, will cooperate with the power take-off shaft 23, with the transmission shaft 34, or with both the power take-off shaft and the transmission shaft. The function of the free wheel 41 is to allow the power take-off shaft, which is primarily driven by the turbine rotor 17, to rotate faster than would be determined by the surrounding gears. However, should the power take-off shaft "lag behind," torque will be applied from either or both the rotors 18 or 10.

The same applies to the free wheel 43. The speed of the shaft 34 is primarily determined by the turbine rotor 10, and this shaft should be permitted to operate at its desired speed, even if the power output is reduced. On the other hand, there must be a possibility to transmit power from either or both power turbine rotors if it is desirable to accelerate the gas production. The plant, so far described can be integrated into a common housing, which is easily mounted within the vehicle, and from one end of which the power take-off protrudes.

When the power plant is arranged with its system of axes transversely with respect to the vehicle, a very limited space in the longitudinal direction is occupied, and there will remain ample space for the fitting of bumpers and other equipment independently of the power plant being located in the front or in the rear. The distance between the ends of the power plant and the driven wheels will, however, in a car of conventional type be comparatively short. Pendulum shafts extending directly from the engine to the driven wheels will then also be short and will meet difficulties in following the movements due to the necessary spring action at the wheels. There must, furthermore, be space available for the mounting of a reversing gear.

According to the invention, a differential 45, of the conventional bevel gear type, is fitted about intermediate the driven vehicle wheels 46, of which only one is shown in the drawing. To each side of the differential, there is a first knee joint 47, and at each wheel, there is a second knee joint 48. A pendulum shaft 49 extends between each first and second knee joint 47 and 48, respectively. These pendulum shafts will be sufficiently long to permit their outer ends to follow the movements of the wheels due to spring action, without too big an angular displacement.

The design of the wheel structure, and the suspension thereof is not shown in detail, as such components are well known in the art, and will vary with the make of the vehicle and also with the power plant being fitted to cooperate with the rear wheels or with the front wheels. In the latter case, the steering of the vehicle will also have to be considered.

The transfer of power between the power take-off shaft 23 and differential 45 includes a reversing gear fitted directly upon the power take-off shaft 23, which carries a sun wheel 50 of a second planetary gearing.

A planetary wheel carrier 51 of said second planetary gearing is adapted to cooperate with two braking devices, of which a first one, 52, is mounted upon the power take-off shaft 23. A second braking device 53 is mounted at a housing 54 enclosing the planetary gearing.

It is evident that the planetary wheel carrier 51, depending upon which of the two braking devices is occasionally engaged, will follow the power take-off shaft in its rotation, or will be kept stationary, and that the direction of rotation of a ring wheel of the planetary gearing may be determined by engaging either of the braking devices. If both braking devices are disengaged, the power plant will be disconnected from the driving gear.

The driving gear includes a pinion 56 being integral with, or attached to a ring wheel 55 of the second planetary gearing, and which is rotatably mounted upon the inner end of the power take-off shaft 23. A gear wheel 57 is mounted upon a further transfer shaft 58, which extends from the power take-off of the plant to the differential 45. This is provided with an external gear wheel 59, driving the satellite wheels of the differential, and cooperates with a second gear wheel 60 upon the further transfer shaft 58.

The housing 54 enclosing the reversing gear and gear wheel 57 is attached to the housing of the power plant, and in the same manner, the differential 45 and the cooperating gear wheel 60 is enclosed in a casing 61.

FIG. 2 schematically shows an example of a suitable location of the power plant providing a low silhouette and good accessibility for servicing the combustion chamber and the heat exchanger. The combustion chamber may be directed forwards or rearwards depending upon the engine being installed in the front or in the back of the car. The arrangement of the heat exchanger may vary within wide limits, depending upon the space available below the hood.

In the drawing and the specification, all three turbine rotors have been described as single disc units, but it is evident that any of the rotors, or all of them, may be multiple stage ones, and that other modifications to the basic design, which do not influence the conditions laid down in the claims, may be found advantageous, depending upon the size of the plant and the power to be extracted therefrom. No means for governing the supply of fuel and for watching temperature, speed and so forth have been shown, as such means are well known in the art and may easily be selected by a designer skilled in the art.

What I claim is:

1. In a gas turbine engine for driving a pair of wheels at a vehicle and adapted to be mounted adjacent to said wheels and including a rotor unit comprising a compressor and a turbine rotor driving the same, a combustion chamber having fuel burning means and being supplied with air from said compressor, means providing a gas flow path downstream of said combustion chamber, concentric shafts arranged in the gas flow path, said concentric shafts being aligned with the axis of the compressor/turbine rotor unit, first and second power turbine rotors mounted upon said concentric shafts and including a transmission comprising a common housing, a further shaft geared to said turbine rotor shafts within the common housing and adapted to transfer power between the power turbine rotors and the compressor/turbine rotor unit, the improvement including a power take-off shaft from the power turbine rotors coaxially aligned with said transmission shaft, a first planetary gearing, enclosed in a housing and including a sun wheel, a planetary wheel carrier and an enclosing ring wheel mounted upon said power take-off shaft, said sun wheel being carried by said power take-off shaft, upon which said planetary wheel carrier is rotatably mounted and a pinion with which said ring wheel is geared, means provided at said power take-off and at said housing for locking, at will, said planetary wheel carrier to either of said power take-off or said housing, a differential located about midway between said pair of wheels and two pendulum shafts to connect said differential with said vehicle wheels, an external gear wheel for driving the differential, and an external transmission shaft having ends, a gear wheel at each end for cooperation with said ring wheel pinion and said differential external gear wheel, respectively, connecting said first planetary gearing with the differential.

2. The gas turbine engine according to claim 1, including first gearing, the power take-off shaft, by way of said first gearing, being directly connected to the first power turbine rotor, while the second power turbine rotor, by way of a second gearing including a planetary gear step and first and second free-wheels, is connected to the power take-off shaft as well as to the internal transmission shaft, means for governing the power distribution between the two power turbine rotors being provided in the gas path adjacent to the first power turbine rotor.

3. The gas turbine engine according to claim 2, in which the power take-off shaft carries the sun wheel of the planetary gear included in the gearing at the second power turbine rotor, a gear wheel in said gearing being formed as planetary wheel carrier, while the sun wheel of the said planetary gearing, by way of the first free wheel, cooperates with said internal transmission shaft, and the latter by way of said second free wheel cooperates with the power take-off shaft.

* * * * *